United States Patent [19]

Skala

[11] 3,972,053

[45] July 27, 1976

[54] INK DROP PRINTER WITH TRANSFER MEMBERS

[76] Inventor: Stephen F. Skala, 3839 S. Wenonah, Berwyn, Ill. 60402

[22] Filed: Aug. 20, 1975

[21] Appl. No.: 605,992

Related U.S. Application Data

[63] Continuation-in-part of Ser. No. 421,425, Dec. 3, 1973, abandoned.

[52] U.S. Cl. .......................................... 346/75; 346/1

[51] Int. Cl.[2] ..................... G01D 15/18; G01D 9/00

[58] Field of Search .................. 346/1, 75, 140, 74; 101/426

[56] References Cited

UNITED STATES PATENTS

| | | | |
|---|---|---|---|
| 3,298,030 | 1/1967 | Lewis et al. | 346/140 X |
| 3,465,351 | 9/1969 | Keur et al. | 346/75 |
| 3,823,409 | 7/1974 | Carrell | 346/1 X |

*Primary Examiner*—George H. Miller, Jr.
*Attorney, Agent, or Firm*—Dominik, Knechtel, Godula & Demeur

[57] ABSTRACT

A signal responsive printer selectively deposits drops of liquid ink onto a moving sheet of ordinary paper. Columns of monodisperse drops traverse a linear array of stationary selective structures consisting of alternating signal and transfer members. The signal members are directly signal responsive. The transfer members switch between adjacent signal members synchronously with the traversing ink drop columns assuring that when an ink drop column is proximate to a junction gap between the selective structures, both adjacent members are at the same selection intensity level.

In one embodiment, the selective structures are deflecting electrodes through which columns of uniformly charged ink drops pass. When an ink drop column is proximate to a junction gap, adjacent signal and transfer deflecting electrodes are at the same selection intensity level which is an intensity level of an ink drop deflecting electrostatic field. In another embodiment, a signal responsive electrostatic charge is induced on forming ink drops by signal and transfer charging electrodes. In yet another embodiment, a signal responsive electrostatic charge can prevent deposition of ink drops by dispersing an ink jet. In still yet another embodiment, a signal responsive magnetic polarization is induced in passing drops of magnetic ink by signal or transfer electromagnets.

7 Claims, 5 Drawing Figures

INK DROP PRINTER WITH TRANSFER MEMBERS

BACKGROUND OF THE INVENTION

The present application is a continuation-in-part of application Ser. No. 421,425 filed Dec. 3, 1973 and now abandoned.

This invention relates to ink drop printing and more particularly to methods for selecting ink drops to be deposited on paper.

Signal responsive publishing can provide convenient transmission of graphic information, large information capacity, and selection of programming to satisfy individual interests. Numerous facsimile recording processes have been proposed. A convenient summary of these processes may be found in "A Facsimile Survey" (1972) published by The Technical Association of the Pulp and Paper Industry. Of particular interest are those methods which permit the use of ordinary paper and bulk liquid ink. Among these methods, a catagory which has suitable characteristics is ink drop printing wherein liquid ink emerges from a capillary or orifice and forms a column of monodisperse drops from which some of the drops are selected for deposit on paper. A survey of this catagory may be found in "Ink Jet Printing" by F. J. Kamphoefner, IEEE Transactions, ED-19, April 1972, pages 584–593. Several of these ink drop printing methods have demonstrated a degree of resolution adequate for publishing and have been applied commercially to message printing and to other recording purposes.

One ink drop printing method is disclosed by R. G. Sweet in U.S. Pat. No. 3,596,275 and is described by him in more detail in "High Frequency Oscillography with Electrostatically Deflected Ink Jets" (1964), AD 437,951 available from the National Technical Information Service. A periodically disturbed jet tends to form drops of uniform size and interval which travel along identical trajectories. An electrostatic charge may be induced by capacitively coupling the jet to a charging electrode. Drops forming from the jet retain the electrostatic charge and can subsequently be deflected by an electrostatic field. When the charging electrode is signal responsive, a graphic pattern can be formed.

Another ink drop printing method is disclosed by C. H. Hertz in U.S. Pat. No. 3,416,153. A periodically disturbed jet is used as in the Sweet method, but a narrower jet and higher signal responsive voltage on the charging electrode result in selective electrostatic dispersion of the jet into small charged droplets which can be collected in a constant electrostatic field. Uncharged monodisperse drops proceed undeflected to deposit on paper.

Yet another ink drop printing method is disclosed by B. Kazan in U.S. Pat. No. 3,287,734. A column of monodisperse drops containing colloidal ferrite particles passes through a signal responsive magnetic field which induces a magnetic polarization in the drops. The drops then pass through a constant magnetic field having a substantial gradient which deflects only the magnetically polarized drops.

Still another ink drop printing method is disclosed by C. H. Richards in U.S. Pat. No. 2,600,129, by C. R. Winston in U.S. Pat. No. 3,060,429, and by E. Ascoli in U.S. Pat. No. 3,136,594. Liquid ink emerges from a capillary or orifice under combined hydrostatic pressure and electrostatic force as uniformly charged monodisperse drops. The charged drops subsequently may be deflected by a signal responsive electrostatic field.

These and other basic ink drop printing methods in which monodisperse ink drops projected along a trajectory are selected for deposit on paper may be used in the practice of the present invention. Since the present invention can be adapted to many basic ink drop methods, it is convenient to designate signal responsive structures such as charging, dispersing, or deflecting electrodes or polarizing magnets by the generic term, selective structures. The corresponding intensity of the electric or magnetic field is designated selection intensity level. Ink drops project along definite trajectories which are determined by the selection intensity levels. These ink drop trajectories are generally in motion relative to paper and are designated traversing ink drop trajectories.

Examples of the graphic quality attainable by the Hertz or Sweet ink drop printing methods may be found in the previously cited article by F. J. Kamphoefner. Both samples were printed by a stationary source selectively depositing ink drops on paper mounted to a drum which was rotated and indexed at each revolution. The printing time for a newspaper size page would be 6 and 20 minutes respectively. For signal responsive publishing in consumer's homes, it would be desireable to improve paper handling and increase printing speed while retaining image quality. Paper handling is most convenient when a flat sheet can be drawn from a roll. Both sides can then be printed and sheets cut and stacked automatically. Printing speed can be increased directly by a plurality of ink drop trajectories traversing linearly at a constant speed.

Prior art methods for traversing a plurality of ink drop trajectories would have several deficiencies in publishing applications. Oscillation, for example, is nonlinear and electrostatic sweep lacks accuracy in joining line segments. Linear traverse of ink drop trajectories at a constant speed, however, would require corresponding motion of the selective structures since conventional methods do not assure uniformity of selection intensity levels between adjacent selective structures.

OBJECTS AND ADVANTAGES OF THE INVENTION

It is a general object of this invention to provide an improved signal responsive printer having a rapid printout of high quality.

It is another object to provide a signal responsive ink drop printer wherein a plurality of ink drop trajectories operating simultaneously traverse with a constant linear motion.

It is yet another object to provide a printer of the type described in which selective structures which control the traversing ink drop trajectories are stationary.

SUMMARY OF THE INVENTION

These and other objects which will occur to practitioners are accomplished in accordance with the present invention wherein a plurality of ink drop trajectories traverse a linear array of stationary selective structures. The selective structures act on a column of ink drops so that some ink drops project along one trajectory to deposit on paper while the other ink drops project along another trajectory into an ink catcher for recycling.

The method of selectively deflecting drops can be direct with a deflecting force applied directly to selected drops, or the method can be indirect under an influence of a characteristic which subsequently causes selected drops to be deflected. As an example of the direct method, an electrical charge is uniformly induced and remains on all of the drops. The charged drops pass through a signal responsive electrostatic field and are deflected in proportion to the intensity of the field. As an example of the indirect method, one of a plurality of levels of electrical charge is induced on the drops. All of the drops then pass through a constant electrostatic field and are deflected in proportion to their charge.

Both the direct and indirect methods of selectively deflecting drops can be adapted to a plurality of drop sources simultaneously traversing a linear array of stationary selective structures. Adjoining selective structures, however, can not both be directly signal responsive since, when they are at different selection intensity levels, variation of the selection intensity level near their common junction gap would distort drop trajectories. When adjoining selective structures are at the same selection intensity level, variation of the selection intensity level near and across their common junction gap is minimal and drop trajectories can traverse the junction gap substantially without distortion.

Auxilliary selective structures having a transfer action and alternating with directly signal responsive signal members of the linear array of selective structures are used to advantage in this invention. These transfer members assure that adjoining selective structures are at the same selection intensity level when drops are proximate. The transfer members switch between adjoining signal members synchronously with the motion of the traversing ink drop trajectories. The distance between the traversing ink drop trajectories is the same as the distance between centers of selective structures of the same kind. As an example, ink drop trajectories may all be centered on the signal members at some particular time. All transfer members are switched commonly when ink drop trajectories are either over the centers of the signal members or over the centers of the transfer members.

As selected drops deposit on paper to form a graphic image in the direction of the ink drop trajectories, the paper advances in a perpendicular direction. Each traversing ink drop trajectory completes a line of ink drops across the paper, and the sequence of the lines of ink drops across the paper is the same as the sequence of ink drop trajectories.

DESCRIPTION OF THE VIEWS OF THE DRAWINGS

Referring now to the drawings, FIG. 1 shows an elementary embodiment which illustrates essential features of this invention.

Figure 1:
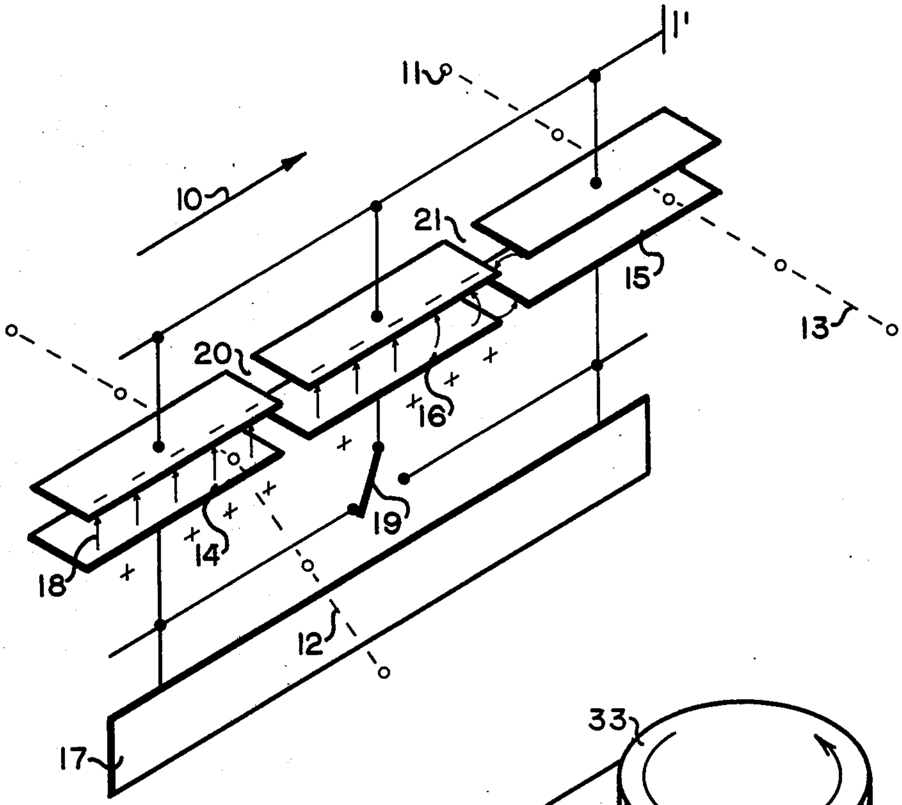
FIG. 1 is a schematic perspective view of an elementary embodiment of an ink drop printer based on the method of Richards illustrating the function of a transfer member.

A source, not shown, of monodisperse ink drops which have a uniform electrical charge, traverses in the direction of arrow 10. The ink drops 11 project along trajectories such as 12 and 13 which pass through deflecting electrodes consisting of signal members 14 and 15 separated by transfer member 16. The deflecting electrodes are a portion of a linear array of similar selective structures.

Graphic information is used by signal source 17 to control voltage levels on signal members. As depicted, signal member 14 has a positive voltage on the bottom electrode which results in an electrostatic field indicated by arrows 18 which deflects the negatively charged ink drops along a trajectory such as 12. Signal member 15 is depicted at ground potential and ink drops pass through undeflected along a trajectory such as 13. In this embodiment, ink drop selection intensity levels consist of either an electrostatic deflection field at one intensity level or an absence of an electrostatic deflection field.

A transfer switch 19 connects the transfer member 16 to the voltage level of one of the adjacent signal members. In the switch position shown, ink drops in trajectory 12 are deflected jointly by signal member 14 and transfer member 16 as the trajectory moves through the region of junction gap 20. The electrostatic deflection field is effectively constant in the region of junction gaps when the adjacent electrodes are at the same potential. The basic function of a transfer member is apparent from the electrostatic field shown by the arrows at junction gap 21 which could deflect ink drops along undesireable trajectories. Such undesireable trajectories are precluded by synchronizing the positions of the trajectories with the positions of the transfer switches. When an ink drop trajectory is positioned at the center of a transfer member, the transfer switch connects the transfer member to the voltage level of the more proximate signal member which the trajectory is approaching.

In order for all ink drop trajectories to be similarly located with respect to the selective structures, the spacing between trajectories is equal to the spacing between centers of the transfer members which is also equal to the spacing between centers of the signal members.

Figure 2:
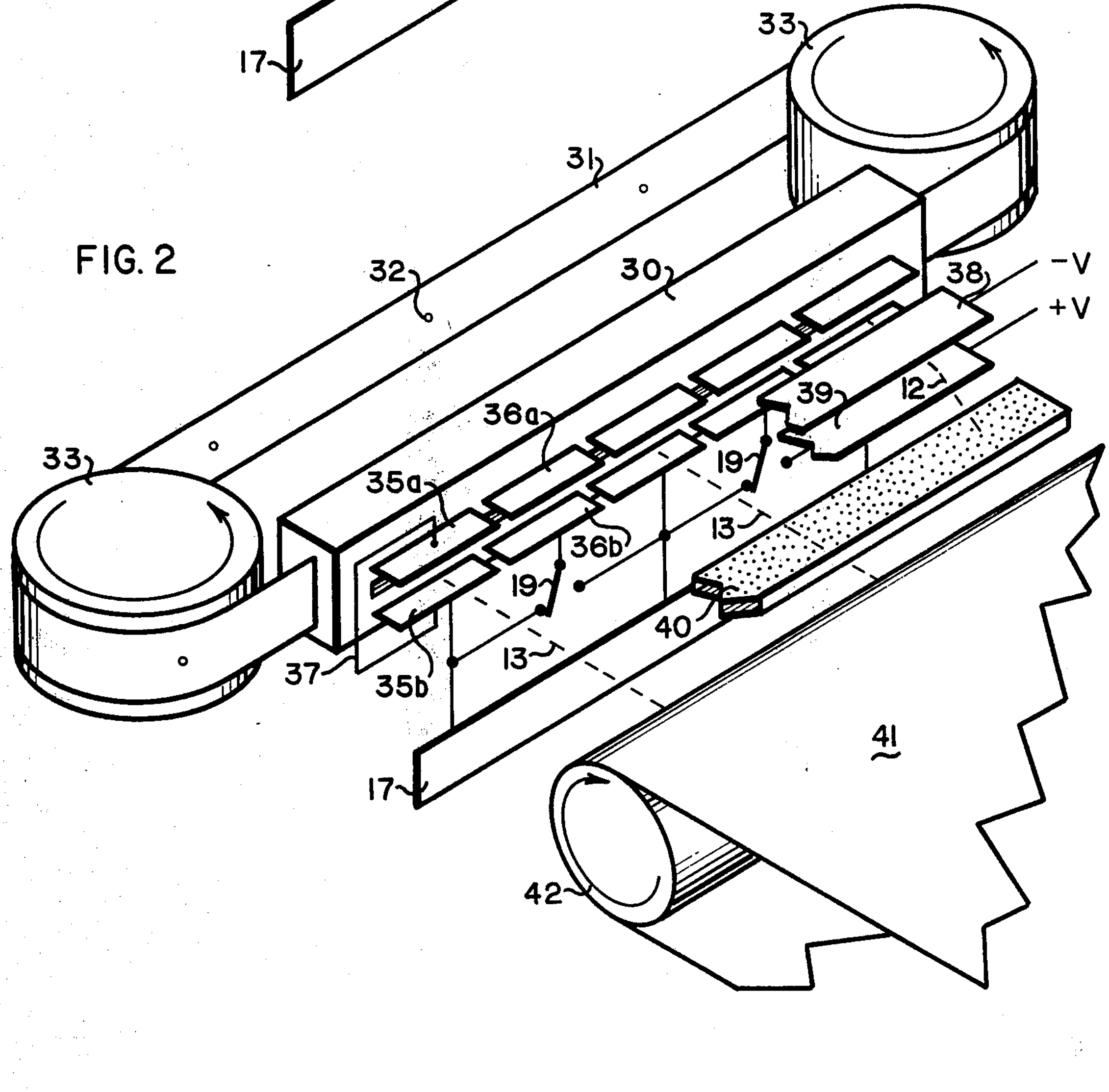
FIG. 2 is a schematic perspective view of an ink drop printer based on the method of Sweet with a source of traversing ink drop trajectories.

FIG. 2 shows the basic components of an ink drop printer with transfer members.

An ink drop forming assembly includes stationary member 30 which contains liquid ink under pressure, a flexible band 31 with orifices 32 from which ink can emerge, and pulleys 33 which advance the orifice band. An orifice band is the preferred source of traversing monodisperse ink drops and is described in more detail in a copending application.

A stationary selective structure includes charging electrodes consisting of signal members which have an upper portion 35*a* and a lower portion 35*b* and transfer members having an upper portion 36*a* and a lower portion 36*b*. The upper and lower portions of each of the charging electrodes are connected by a conductor 37 shown connecting only one of the charging electrodes. Ink jets emerging from orifices project between charging electrodes and acquire an electrostatic charge which is proportional to the product of voltage and capacitance between a jet and a charging electrode. The function of signal source 17 and transfer switches 19 is similar to that described with reference to FIG. 1. Adjacent signal and transfer members most proximate to an approaching ink jet are at the same voltage and the electrostatic charging field in the region of their junction gaps is effectively uniform. As ink drops detach from an ink jet between a charging electrode, charge induced on the jet remains on the drops. An electrostatic field established between deflecting electrodes 38 and 39 deflects charged drops along a trajectory such as 12 while uncharged drops are not deflected as is shown by trajectories 13. Ink drop selection intensity levels consist of ink jet charging voltages or an absence of such voltages.

Assemblies on which ink drops deposit include ink catcher 40 and paper or other ink receiving surface 41. Ink drops projecting along deflected trajectories such as 120 deposit on the ink catcher, pass through a porous surface, and are returned by pumping means, not shown, back to the ink drop forming assembly. Undeflected drops deposit on the sheet of paper advancing over guide roll 42. Each undeflected trajectory, consisting of a modulated column of ink drops, traverses across the paper depositing a line of ink drops in a graphic pattern. The advancing paper positions the line of drops deposited by the following undeflected trajectory just below the previous line so that a graphic image is synthesized from lines of deposited ink drops.

Figure 3:
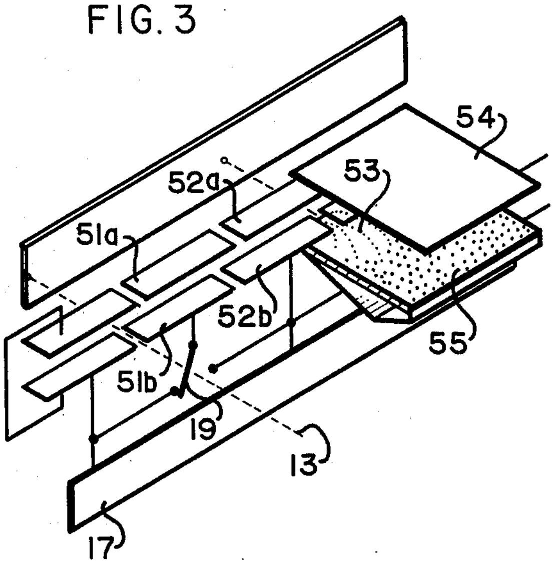
FIG. 3 is a schematic perspective view of a portion of an ink drop printer based on the method of Hertz showing selective structures and a means for collecting dispersed charged ink droplets.

An ink drop printer with the selective structures shown in FIG. 3 is based upon the methods disclosed by Hertz in a previously cited patent. Briefly, an ink jet is projected through charging electrodes. With zero voltage on the charging electrode, the jet forms uncharged monodisperse drops which continue to project toward a paper receiving surface. A high voltage on a charging electrode induces an electric charge of sufficient magnitude to cause the jet to disperse into a spray of charged droplets which can be collected on a deflecting electrode. Both the Hertz method and the Sweet method select ink drops for printing by inducing an electric charge on an ink jet and the printers based on these methods have a similar structure.

An ink jet proximate to transfer electrodes **51*a* and 51*b*, which are shown at zero voltage, forms drops which project along trajectories such as 13. An ink jet proximate to signal electrodes 52*a* and 52*b*, which are shown at a high voltage, is dispersed into droplets 53 which are deflected by an electrostatic field between deflecting electrodes 54 and 55. Deflecting electrode 55** also functions as an ink catcher and draws ink through its porous surface.

Figure 4:
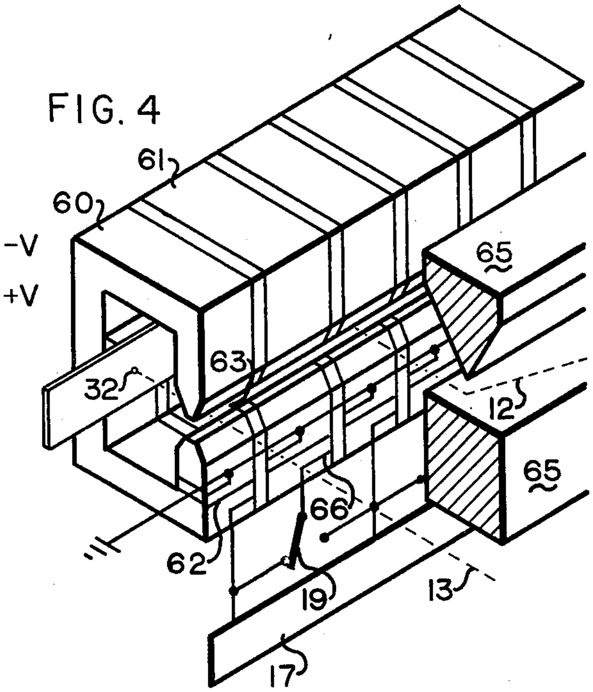
FIG. 4 is a schematic perspective view of a portion of an ink drop printer based on the method of Kazan showing selective structures.

FIG. 4 shows the selective structures of an ink drop printer based upon the previously cited method of Kazan. Jets of ink containing colloidal ferrite particles emerge from orifices 32 and form traversing columns of monodisperse drops. The stationary selective structure includes polarizing magnets consisting of signal members 60 and transfer members 61. Electric current flowing from signal source 17 through coils such as 62 around the signal members causes a magnetic field in gap 63. Ink drops passing through gap 63 are polarized when a magnetic field is present and are then deflected by permanent magnet 65, only a portion of which is shown, along a trajectory such as 12 into an ink catcher, not shown. Ink drops which are not subject to a magnetic field in gap 63 are unpolarized and travel in an undeflected trajectory such as 13 onto a paper receiving surface, not shown. Ink drop selection intensity levels consist of the presence or absence of a polarizing magnetic field. Coils 66 around transfer members 61 are controlled by transfer switches 19 operating synchronously with the positions of the ink drop trajectories so that adjacent signal and transfer members most proximate to an approaching ink drop trajectory have polarizing magnetic fields of the same direction and magnitude. Such synchronous switching action provides an effectively uniform polarizing magnetic field in the region of a junction gap.

Figure 5:
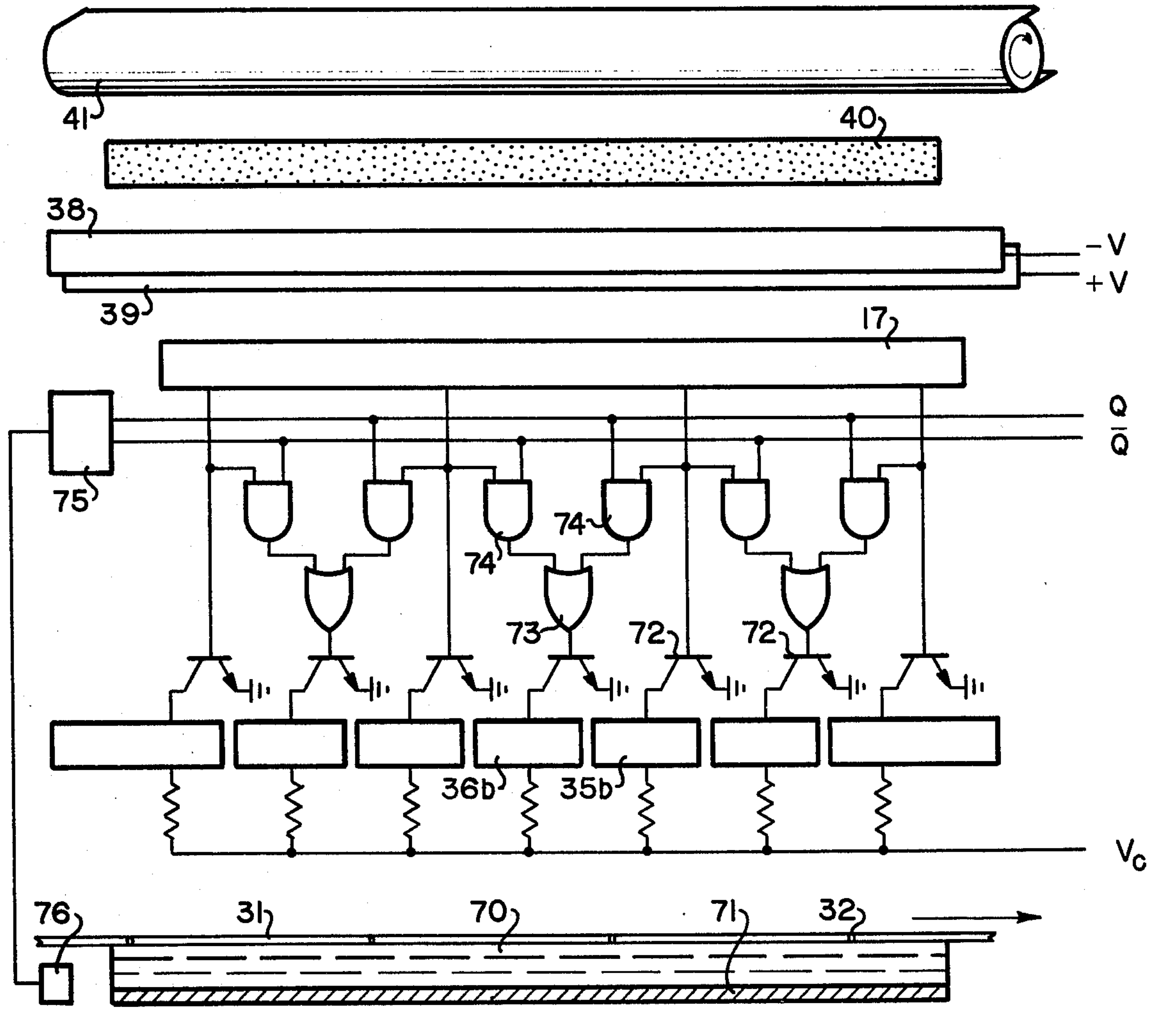
FIG. 5 is a schematic diagram showing in more detail signal responsive selective structures, their dimensional relation to a source of ink drop trajectories, means for electronic switching of transfer members, and means for synchronizing switching of the transfer members with the position of the ink drop trajectories.

FIG. 5 shows an electronic equivalent to the transfer switches designated 19 in previous drawings and also shows a method for synchronizing ink drop trajectories with the switching action of transfer switches. FIG. 5 corresponds particularly to the embodiment of FIG. 2, but it can be modified to correspond to the other disclosed embodiments.

The ink drop forming assembly includes orifice band 31 with orifices 32, a body of liquid ink under pressure 70, and a piezoelectric vibrator 71 which induces periodicity on emerging ink jets. This periodicity assures formation of monodisperse drops. The stationary selective structure includes charging electrodes consisting of signal members **35*b* and transfer members 36*b*. Transistors 72 control the voltage level of the charging electrodes in response to signals from signal source 17. A signal member is controlled directly by the signal source. A transfer member receives its control signal from an OR gate 73 which receives its control signal from one of two AND gates 74. Each AND gate receives a control signal from a signal source output which also controls an adjacent signal member, and it also receives a control signal from multivibrator 75 which has an output Q and a complementary output $\overline{Q}$. When the control signal on Q is at a high level, all transfer members to the left of a signal member are at the selection intensity level of that signal member. Similarly, when the control signal on $\overline{Q}$ is at a high level, all transfer members to the right of a signal member are at the selection intensity level of that signal member. The multivibrator is synchronized with the orifice band through detector 76** which senses passage of an orifice and triggers the multivibrator. When an orifice is sensed, an ink drop trajectory is passing over the center of each transfer member and the multivibrator output switches to a high level on Q. A transfer member is then at the same selection intensity level as the signal member on its right which is most proximate and is being approached. When ink drop trajectories pass the center of the signal members, the multivibrator is timed to automatically switch back so that a transfer member is in the same selection state as the signal member to its left which is now most proximate.

Charged ink drops are deflected by deflecting electrodes 38 and 39 onto ink catcher 40 while uncharged drops deposit on paper 41.

FIG. 5 can correspond to the embodiment of FIG. 3 when charging electrodes **35*b* and 36*b* are replaced by dispersion electrodes 51*b* and 52*b*. FIG. 5 can also correspond to the embodiment of FIG. 4 when the charging electrodes are replaced by coils 62 and 66,** and deflection electrodes 38 and 39 are replaced by permanent magnet 65.

Although several specific embodiments of the invention have been disclosed, it is apparent that numerous variations may be practiced without departing from the invention.

A linear array of selective structures is normally preferred since most printing applications use a flat sheet of paper. In other applications, such as printing on containers, surfaces may be convex while in other cases concave surfaces may be appropriate. Accordingly, the term linear is intended to include the more general curvilinear configurations.

The source of traversing ink drop trajectories may include alternative ink drop forming means such as capillaries. The traversing means may be flexible or rigid, and the path traversed may be any curvilinear configuration corresponding to the selective structures.

It is also apparent that alternative methods for selecting ink drops for deposition on paper can be adapted to the method of transfer electrodes. A linear array of air streams, for example, may flow through signal responsive signal and transfer members with the transfer members switching to provide uniform flow across the junction gaps having proximate ink drop trajectories. More generally, the selective structures induce a characteristic in or apply a force to passing ink jets or ink drops. Such forces or characteristics are extended to both sides of a junction gap by transfer members when the ink drops are proximate.

What is claimed is:

1. A method of printing by selectively depositing liquid ink drops on a receiving surface in response to graphic information from a signal source, including the steps of forming a plurality of equally spaced traversing ink drop trajectories, projecting said ink drop trajectories toward a plurality of signal responsive selective structures having a linear array of signal members and transfer members, said transfer members switching between adjacent signal members, each member being separated from an adjacent member by a junction gap, and the spacing between the centers of similar members being equal to the spacing between said ink drop trajectories, synchronizing switching of the transfer members with the position of the ink drop trajectories so that the signal members and the transfer members adjoining a junction gap are at the same selection intensity level when an ink drop trajectory is proximate to said junction gap, and deflecting ink drops in said ink drop trajectories subject to said selection intensity levels so that ink drops selected for printing deposit on the receiving surface.

2. The method of claim 1 wherein said ink drops are electrically charged to uniform levels and said selective structures are a source of signal responsive electrostatic fields which selectively deflect the ink drops.

3. The method of claim 1 wherein said selective structures selectively induce an electrostatic charge on the ink drops so that the charged ink drops are deflected by an electrostatic field.

4. The method of claim 1 wherein said ink drops contain magnetically polarizable particles, and said selective structures are electromagnets which induce a magnetic polarization in the ink drops so that polarized ink drops are deflected by a magnetic field.

5. A method which includes the steps of claim 1 wherein said selection intensity level has two levels, and steps are characterized by one of the levels causing selected ink drops to deposit on the receiving surface while said receiving surface moves in a direction perpendicular to the motion of the traversing ink drop trajectories, and by the other level causing the remaining ink drops to be collected without deposit on the ink receiving surface.

6. An apparatus for printing graphic information by depositing liquid ink drops on a receiving surface including means to form a plurality of traversing ink drop trajectories, a linear array of alternating signal members and transfer members, each signal member being directly signal responsive and each transfer member functioning to switch a selection intensity level to an adjoining signal member, means to switch the transfer members in accordance with the traversing motion of the ink drop trajectories, an ink catcher to intercept and collect some of the ink drops, a receiving surface on which other ink drops are selected for printing deposit, and means to move the receiving surface for a succeeding printing deposit.

7. An apparatus which includes the features of claim 6 wherein said transfer member switching means includes a multivibrator having two complementary outputs, means to synchronize said outputs with the position of the ink drop trajectories, two AND gates, one AND gate receiving the control signal for an adjacent signal member and an output from the multivibrator, the other AND gate receiving the control signal for the other adjacent signal member and the complementary output from the multivibrator, and an OR gate receiving the outputs of the two AND gates to provide an output corresponding to the output of one of the AND gates.

* * * * *